(12) United States Patent
Lin et al.

(10) Patent No.: US 9,142,014 B2
(45) Date of Patent: Sep. 22, 2015

(54) SYSTEM AND METHOD FOR IDENTIFYING SYSTEMATIC DEFECTS IN WAFER INSPECTION USING HIERARCHICAL GROUPING AND FILTERING

(71) Applicant: DMO Systems Limited, Hsinchu county (TW)

(72) Inventors: Jason Zse-Cherng Lin, Saratoga, CA (US); Shauh-Teh Juang, Saratoga, CA (US)

(73) Assignee: DMO SYSTEMS LIMITED, Hsinchu County (TW)

( * ) Notice: Subject to any disclaimer, the term of this patent is extended or adjusted under 35 U.S.C. 154(b) by 159 days.

(21) Appl. No.: 13/906,303

(22) Filed: May 30, 2013

(65) Prior Publication Data
US 2014/0355867 A1 Dec. 4, 2014

(51) Int. Cl.
 *G06K 9/00* (2006.01)
 *G06T 7/00* (2006.01)
(52) U.S. Cl.
 CPC ....... *G06T 7/001* (2013.01); *G06T 2207/10061* (2013.01); *G06T 2207/20016* (2013.01); *G06T 2207/30148* (2013.01)
(58) Field of Classification Search
 None
 See application file for complete search history.

(56) References Cited

U.S. PATENT DOCUMENTS

| 6,841,403 | B2 * | 1/2005 | Tanaka et al. | 438/14 |
| 7,378,289 | B1 * | 5/2008 | Ma et al. | 438/14 |
| 2003/0152276 | A1 * | 8/2003 | Kondo et al. | 382/224 |
| 2005/0278597 | A1 * | 12/2005 | Miguelanez et al. | 714/738 |
| 2007/0230770 | A1 * | 10/2007 | Kulkarni et al. | 382/149 |
| 2011/0276935 | A1 * | 11/2011 | Fouquet et al. | 716/112 |

* cited by examiner

*Primary Examiner* — Utpal Shah
*Assistant Examiner* — Mai Tran (57) ABSTRACT

A number of wafers of a same semiconductor device are inspected to generate a plurality of candidate defect lists for identifying systematic defects. Each candidate defect list comprises a plurality of candidate defects obtained from inspecting one of the wafers. Each candidate defect is represented by a plurality of defect attributes including a defect location. The candidate defects in every one or more candidate defect lists are processed as a set by stage one grouping and filtering to generate a stage one defect list for each set. The candidate defects in all the stage one defect lists are then processed together by stage two grouping and filtering to generate a final defect lists for systematic defects. The defect attributes of each defect and a design pattern clip extracted from a design database based on the defect location are used in the hierarchical grouping and filtering.

18 Claims, 8 Drawing Sheets

SYSTEM AND METHOD FOR IDENTIFYING SYSTEMATIC DEFECTS IN WAFER INSPECTION USING HIERARCHICAL GROUPING AND FILTERING

BACKGROUND OF THE INVENTION

1. Field of the Invention

The present invention relates generally to wafer inspection, and more specifically to a method and system for identifying systematic defects in wafer inspection.

2. Description of Related Arts

Producing semiconductors requires a very cost-intensive and sophisticated manufacturing environment. With the size of the structures built on a semiconductor device decreasing, the production costs are increasing at the same pace. Semiconductor production in a modern fab requires several hundreds of machines, with prices reaching several ten-millions or even hundred-millions of US dollars per machine.

The process of semiconductor device manufacturing often requires hundreds of sequential steps, each one of which could lead to yield loss. Consequently, maintaining product quality in a semiconductor manufacturing facility often requires the strict control of hundreds or even thousands of process variables. The issues of high yield, high quality and low cycle time are being addressed in part by the ongoing development of several critical capabilities, i.e. process monitoring, process/equipment modeling, process optimization, process control, equipment and process diagnosis and parametric yield modeling.

During the manufacturing of a semiconductor device, inspection is typically performed by illuminating the manufactured semiconductor wafer using optical sources or electron beams and then analyzing the signals returned from the semiconductor wafer. As the design rule shrinks, the circuit patterns on the semiconductor wafer become very small and dense. Defect signals that can be detected from the inspection are extremely weak and often in the order of the normal variation caused by the manufacturing process. As a result, critical defects of interest can be missed or embedded in thousands or millions of nuisances in the candidate defect list of an inspection result.

Figure 1:
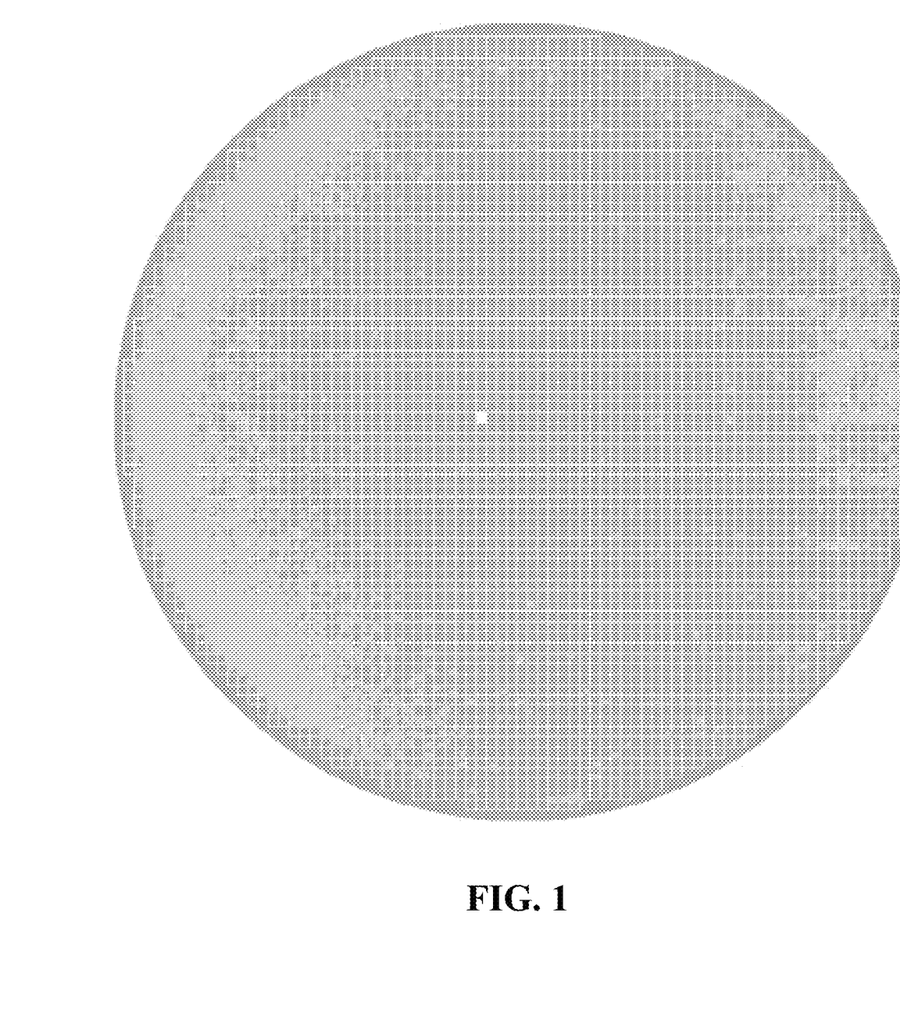
FIG. 1 is a wafer map showing the candidate defect distribution of inspecting a wafer.

FIG. 1 is an exemplary wafer map showing the candidate defect distribution on a wafer of a typical candidate defect list from wafer inspection. As can be seen, the candidate defects generated by the inspection span across the whole wafer and the majority of them are nuisances. Because of the small geometries of the circuit pattern, the image of a candidate defect acquired from the inspection often either shows only a single pixel in the defective area or is not resolvable at all. Semiconductor manufacturers face the challenge of identifying whether the candidates are real killer defects or just nuisances. What makes the inspection further more difficult is that many systematic critical defects are undetectable because their signatures appear no difference from the nuisances in the inspection.

Many signal and image processing techniques have been applied in wafer inspection, trying to eliminate the nuisances and identify real defects that may make the semiconductor device mal-function. In general, inspection results from a handful of wafers are used to optimize the recipes for inspecting future wafers with desired sensitivity and acceptable number of total candidate defects, or train the templates for classifying real defects from nuisances.

As the advanced semiconductor technology pushes the physics limits to shrink the size of the device, conventional methodology of simply analyzing returned signals by illuminating wafer one by one using optical sources or electron beams is no longer sufficient. Critical systematic defects may be barely detectable even though they exist in many locations in a wafer. Eliminating the systematic defects is a huge challenge in ramping up the manufacturing process for volume production. In the volume production, newly occurring systematic defects also have to be identified as early as possible to avoid losing all the manufactured wafers, the ones in the manufacturing pipeline as well as those already being completed.

SUMMARY OF THE INVENTION

The present invention has been made to overcome the above mentioned challenge and deficiency in identifying systematic defects for wafer inspection. Accordingly, the present invention provides a method and system of using data from inspecting multiple wafers and incorporating design data of the manufactured device to efficiently detect and identify systematic defects based on hierarchical grouping and filtering.

In accordance with the present invention, a number of candidate defect lists are obtained from inspecting multiple wafers. In general, such a candidate defect list comprises a large number of candidate defects that are mostly nuisances with very few random or systematic defects embedded therein because of the high density and small geometries in modern advanced semiconductor devices.

In a first preferred embodiment of the present invention, the hierarchical grouping and filtering methodology comprises two stages of processing. In stage one processing, each candidate defect list obtained from one single wafer is processed independently by grouping and filtering using defect attributes acquired during wafer inspection as well as additional attributes derived from the design pattern clips extracted for the candidate defects from design database.

After the stage one grouping and filtering, each candidate defect list generates a stage one defect list. A number of stage one defect lists are generated by stage one processing. Stage two processing then groups and filters the entire candidate defects from all the stage one defect lists together to generate a final defect list. As a result, systematic defects can be identified and grouped because they have similar or identical attributes and generally reoccur in multiple dies and multiple wafers.

In a second preferred embodiment of the present invention, the candidate defect lists obtained from inspecting multiple wafers are first divided into a plurality of sets of candidate defect lists, each set comprising a number of candidate defect lists from several wafers. Each set of candidate defect lists is processed together in stage one processing to generate a stage one defect list. Stage two processing then groups and filters the entire candidate defects from all the stage one defect lists together to generate the final defect list.

In the present invention, a distributed computing system with multiple computing nodes and a design database is used to implement the hierarchical grouping and filtering. The methodology of hierarchical grouping and filtering can be used to identify systematic defects during the ramp-up stage of tuning and optimizing the process of manufacturing semiconductor devices. It may also be used in the volume production stage to monitor and identify newly occurring systematic defects.

In addition to identifying systematic detects from inspecting multiple wafers, the locations of the identified systematic defects can further be used as critical areas in the recipes for inspecting the later manufactured wafers. The design pattern clips of the identified systematic defects can further be used to search the database for all the critical areas that have the same design patterns. Critical areas may be set with higher sensitivity than other inspected areas in inspecting wafers to reduce the number of nuisances in other non-critical areas. Those design patterns clips and their attributes can also be used to optimize the design for manufacturability rules in the chip design flow for yield improvement of semiconductor manufacturing line.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

As can be expected, systematic defects occur on wafers systematically across multiple dies and multiple wafers. To improve the yield of manufacturing semiconductor devices, it is critical to eliminate systematic defects in both ramp-up and volume production stages of manufacturing. The characteristics of systematic defects distinguish themselves from random nuisances when a large amount of inspection results across multiple wafers are analyzed together. In order to identify systematic defects, the present invention provides methodology of using data collected from multiple candidate defect lists obtained from inspecting a large number of wafers.

To overcome the difficulty in separating nuisances from systematic defects, the present invention performs grouping and filtering by incorporating attributes derived from the design pattern clips extracted for candidate defects in addition to defect attributes acquired from wafer inspection. Various features such as line width, line density, proximity to vertices, etc., can be computed from the design pattern clips for performing grouping and filtering.

As is well known, the computation required for grouping a list of candidate defects is usually proportional to the square of the number of candidate defects in the list. When the big data of a large amount of candidate defect lists are combined or used together, the amount of memory and the processing time required for the computation become a huge challenge. Therefore, the methodology in the present invention uses hierarchical grouping and filtering to meet the requirement in processing big data.

Figure 2:
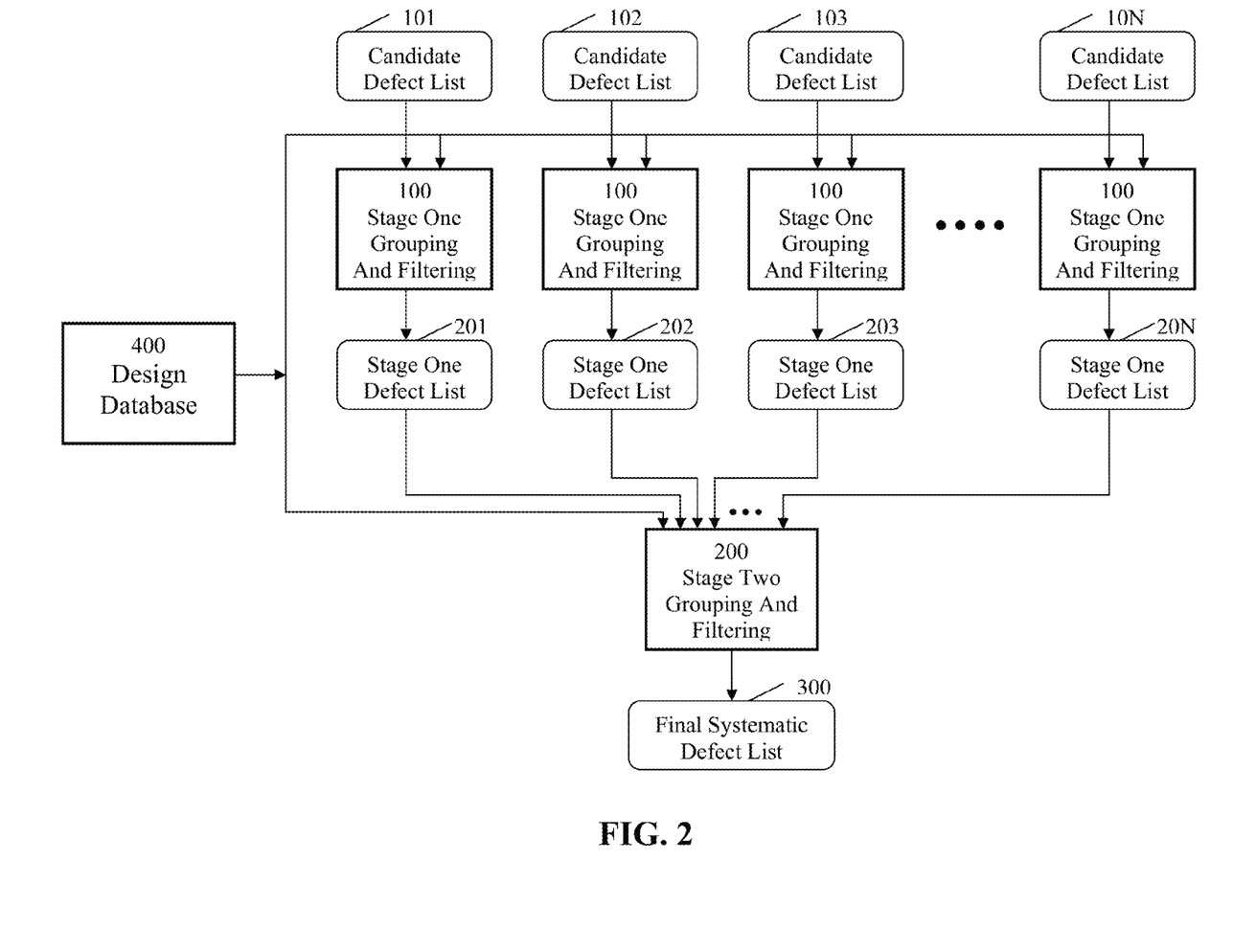
FIG. 2 shows a block diagram of two stage processing of hierarchical grouping and filtering according to one embodiment of the present invention.

FIG. 2 shows a block diagram for the methodology of the present invention according to one embodiment. In the semiconductor industry, equipment vendors provide inspectors for inspecting wafers in a semiconductor fab. In general, an output file that contains a list of candidate defects is generated after inspecting a wafer. Candidate defect lists 101, 102, ..., 10N represent inspection results collected from inspecting N wafers.

Stage one processing 100 performs stage one grouping and filtering by incorporating design pattern clips extracted from design database 400. For example, the grouping in stage one processing 100 may be based on the exact match of the design pattern clips, and the filtering may be to eliminate candidate defects that have unique design patterns and can not be grouped, or in the groups that contain only a small number of candidate defects. Because systematic defects should have multiple occurrences, stage one processing 100 can filter out most of the random defects or nuisances and keeps candidate defects that have identical design patterns.

As can be seen in FIG. 2, stage one processing 100 generates stage one defect lists 201, 202, ..., 20N respectively for the candidate defect lists 101, 102, ..., 10N. Stage two processing 200 receives all the stage one defect lists, performs stage two grouping and filtering, and generates a final systematic defect list 300 for identifying systematic defects. It is understandable that after grouping candidate defects from multiple wafers, defect groups that contain a larger number of defects represent critical defects that occur more systematically and frequently if the exact match of design patterns are used as the criteria in the grouping. Identifying those systematic defects and eliminating their root cause should significantly improve the yield of manufacturing the semiconductor devices.

In the present invention, both stage one and stage two processing can be implemented with general purpose computing nodes or dedicated computing hardware. Both defect attributes acquired during the inspection and design attributes acquired from the design pattern clip can be used as features for filtering or grouping. Filtering may be applied to individual candidate defects or defect groups. The preferred attributes used in the present invention are extracted from the design pattern clips associated with the candidate defects because the design data provides additional information normally not available during wafer inspection. The defect attributes of each candidate defect includes a defect location that can be used to extract design pattern clips from the design database.

Various algorithms can be used for the grouping and filtering required in the processing. As an example, in stage one processing 100, candidate defects whose design patterns are blank may be filtered out first, and then the remaining candidate defects with identical design patterns are grouped in respective groups. Dependent on the practical use cases, various criteria can be designed for the filtering and grouping based on the attributes used in the processing. In the present disclosure, the term grouping and filtering is used to describe the general processing of grouping and filtering that can be in any order or any combination of such processing.

In stage two processing 200, multiple stage one defect lists that contain grouped defects are further grouped and filtered based on some pre-set criteria, and the number of defects in each defect group in the final systematic defect list 300 may be used as a criteria to filter out non-systematic defects. The criteria or recipes used in the two stages may be the same or different for better optimizing the identification of systematic defects.

It is worth pointing out that although conceptually the grouping and filtering can be performed in a single stage by processing all the candidate defect lists together to achieve similar result. The methodology of using hierarchical grouping and filtering of the present invention provides several advantages. One is that the two-stage processing reduces the required computation from being squarely to linearly proportional to the number of candidate defects in all the candidate defect lists. The throughput of processing is significantly improved.

Another advantage is that the methodology eliminates the need of having a huge memory capacity for holding the big data from multiple inspections and the associated design pattern clips at the same time in one single stage of processing. Furthermore, the pre-set criteria and recipes for stage one and stage two processing can be optimized separately to achieve the best performance for grouping and filtering.

Figure 3:
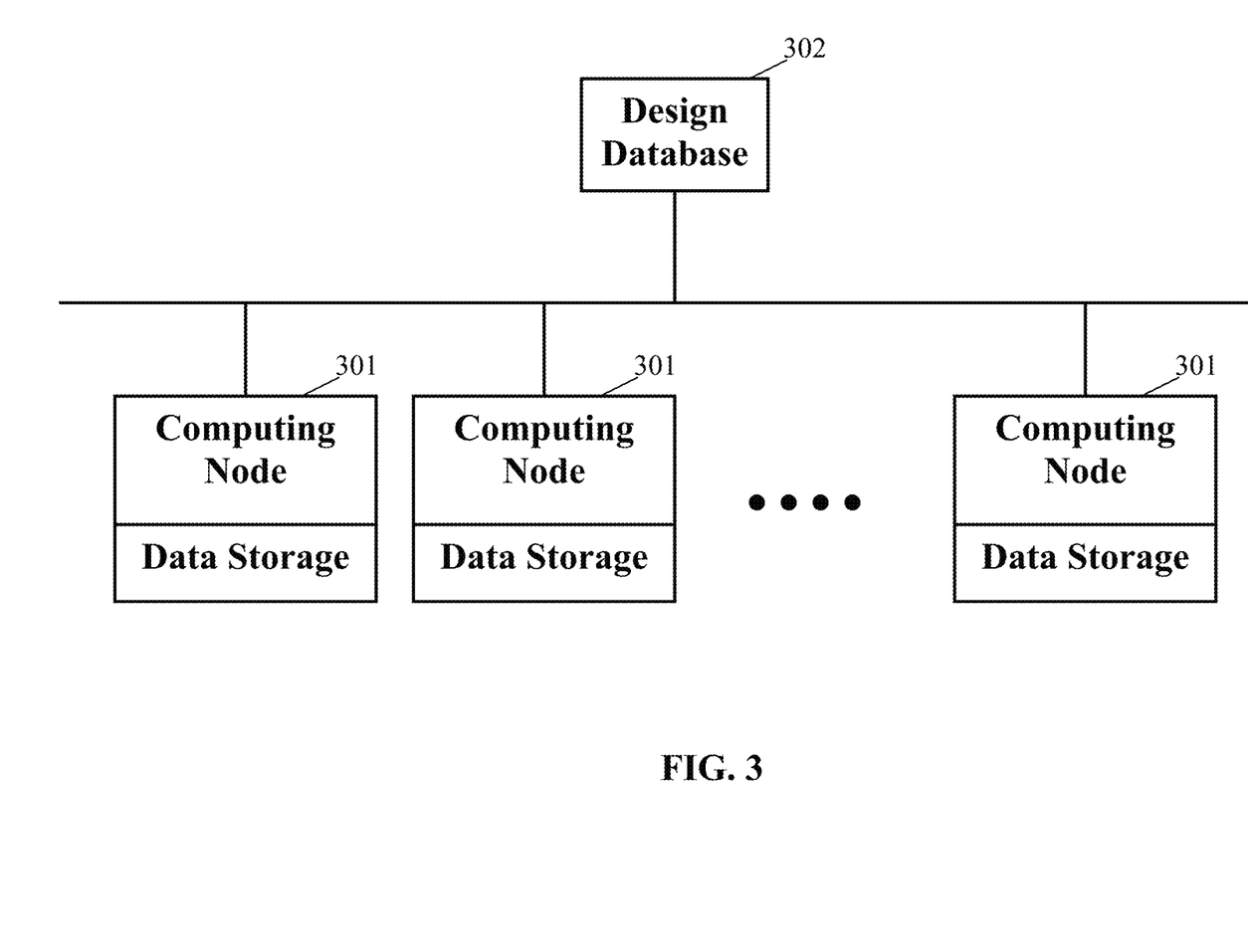
FIG. 3 shows a distributed computing system for implementing hierarchical grouping and filtering according to the present invention.

In the present invention, a distributed computing system with multiple computing nodes is used to implement stage one and stage two processing. FIG. 3 shows a simplified block diagram of the distributed computing system that includes a number of computing nodes 301 and a design database 302 connected in a network. The distributed computing system also includes a data storage system. FIG. 3 shows that each computing node 301 has a data storage unit. The data storage system can be formed by the distributed storage units as shown in FIG. 3 or a dedicated storage system.

As can be seen in FIG. 2, multiple instances of stage one grouping and filtering are performed independently in parallel and they can be distributed to multiple computing nodes 301. As a result, the advantage of the parallel computing architecture of the distributed computing system can be fully taken advantage of by the hierarchical grouping and filtering of the present invention. Both candidate defect lists 101, 102, ..., 10N and the final systematic defect list 300 are stored in the data storage system.

The final systematic defect list 300 comprises a plurality of defect groups each representing a possible systematic defect. A pre-set criteria can be used to determine if the defect group should be considered as a systematic defect or not. For example, a defect group is considered as a systematic defect if the number of defects exceeds a pre-set criteria. A defect location of the systematic defect can also be determined from the locations of the defects in the defect group. If the grouping is based on the exact match of design patterns, the location of the systematic defect can also be determined based on the location of the design pattern in the design database.

According to the present invention, the methodology can be used to identify systematic defects during the early stage of ramping up the processes for manufacturing the semiconductor devices. It can also be used to monitor and identify new systematic defects that may occur during the volume production of the semiconductor devices as well as the trends of the systematic defects.

In addition to identifying systematic detects from inspecting multiple wafers, the locations of the identified systematic defects can further be used as critical areas in the recipes for inspecting the later manufactured wafers. The critical areas would be ideal areas for inspection if slow throughput makes the inspection of a whole wafer impossible. Critical areas may also be set with higher sensitivity than other inspected areas in inspecting a whole wafer if the number of nuisances in other non-critical areas is too high.

Because the preferred approach of grouping defects is based on the design pattern clips extracted from the design database, once the systematic defects are identified, the corresponding design patterns can further be used to search the design database for finding all the locations that have the same design patterns as the systematic defects' across the whole die. The locations can then be used to form micro care areas imported to wafer inspectors for inspecting wafers of the same semiconductor device.

As pointed out above, the advanced semiconductor technology has pushed the limit of physics and even leading edge wafer inspectors have difficulty detecting or distinguishing weak signals of real defects from random nuisances. Some systematic defects may be detected only once or twice in a single wafer although they exist in many locations. Such systematic defects with rare occurrence in a single wafer inspection may be filtered out in stage one processing 100 illustrated in FIG. 2. To solve such a problem, the hierarchical grouping and filtering of the present invention can further be modified as shown in FIG. 4.

Figure 4:
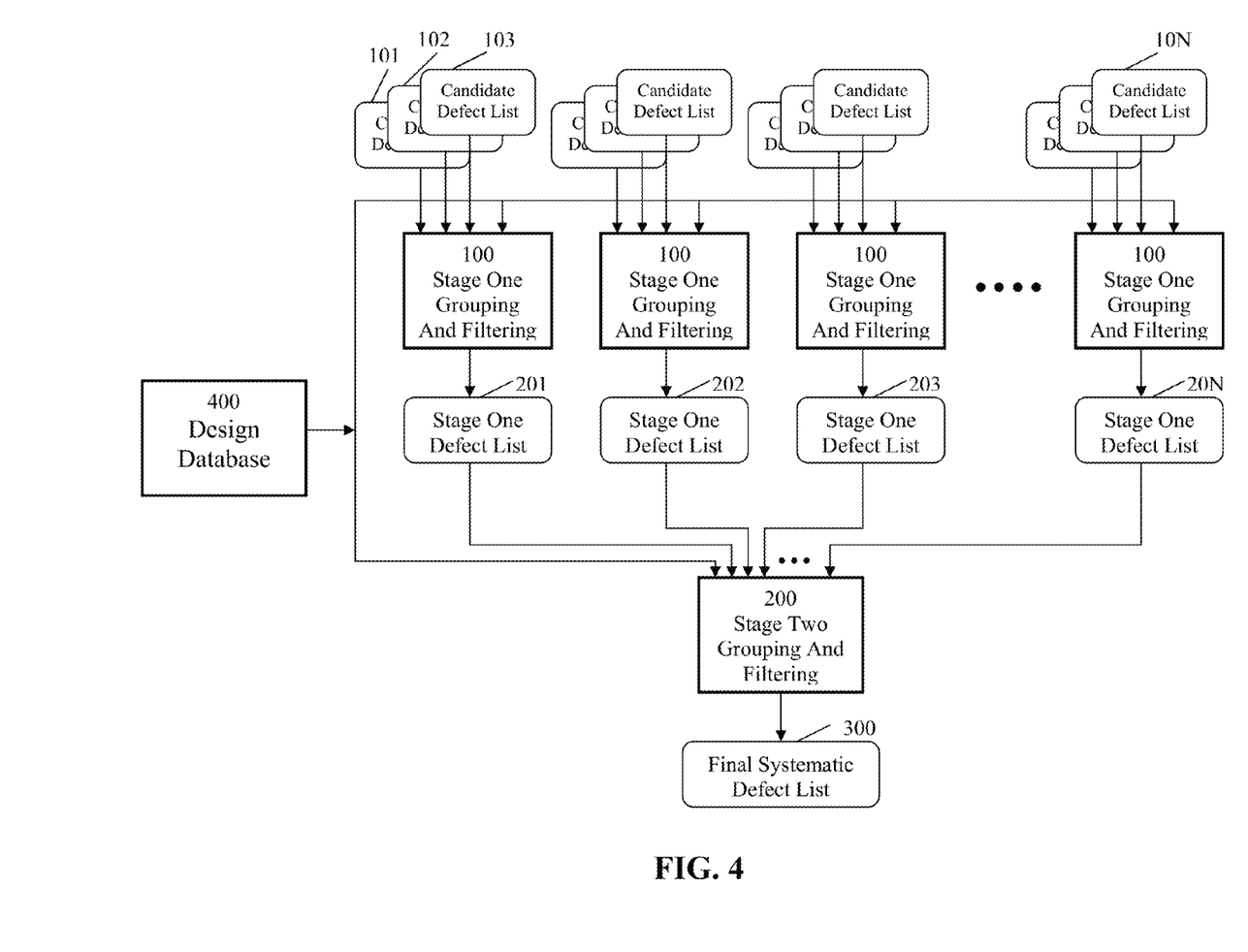
FIG. 4 shows a block diagram of two stage processing of hierarchical grouping and filtering according to another embodiment of the present invention.

With reference to FIG. 4, the candidate defect lists 101, 102, ..., 10N obtained from inspecting multiple wafers are divided into a plurality of sets of candidate defect lists, each set may comprise one or more candidate defect lists. As shown in FIG. 4, in stage one processing 100, three candidate defect lists 101, 102, and 103 are processed together as a set. A stage one defect list is generated from processing each set of three candidate defect lists. Stage two processing 200 then performs stage two filtering and grouping by processing all the candidate defects from all the stage one defect lists 201, 202, ..., 20N.

Although FIGS. 2 and 4 show two preferred embodiments according to of the present invention, the hierarchical grouping and filtering is not limited to two stages of processing. Many variations can be derived from the principle described above. For example, the hierarchy may comprise three stages, stage one defect lists may further be grouped for stage two processing to generate multiple stage two defect lists which are then processed together to generate the final systematic defect list.

In the grouping of candidate defects, preferably the present invention uses exact match of design patterns as grouping criteria. Other data such as high-resolution electron-beam image patterns may also be used if they can provide adequate and accurate information for grouping. Other criteria based on selected attributes available in the candidate defect list or derived from the design pattern clips may also be used if effective grouping algorithms can be designed based on the attributes. For example, candidate defects can be grouped together based on similarity of attributes, design patterns or their combination rather than exact match of design patterns. Similarly, filtering in the present invention may be based on defect attributes obtained from the inspector or derived from the design pattern clips.

In the volume production of semiconductor devices, the present invention also provides a method of monitoring the trends of systematic defects in addition to identifying them. As shown in FIGS. 2 and 4, a group of N candidate defect lists obtained from inspecting N wafers can be used in the hierarchical grouping and filtering to generate a final systematic defect list 300. The method and apparatus can be used in line in the volume production to generate one final systematic defect list every N wafers. After a number of final systematic defect lists are generated, identified systematic defects can be analyzed from the final systematic defect lists to learn the trends of defect numbers or distribution on the wafers for the systematic defects.

According to the present invention, generating multiple final systematic defect lists can be based on every N wafers as a group. To monitor the trends of systematic defects, candidate defect lists obtained from N wafers manufactured sequentially in time are collected for processing in a group. Each group of wafers may be completely different from the other groups or has a few common wafers in adjacent groups. To efficiently generate a plurality of final systematic defect lists from multiple groups of wafers having common wafers, stage one defect lists generated in the block diagrams shown in FIGS. 2 and 4 can be re-used.

For example, assuming that each candidate defect list has a time stamp and is obtained in sequence by inspecting wafers manufactured in a production line. A first systematic defect list can be generated after N candidate defect lists are available and their corresponding stage one defect lists are generated. The following systematic defect lists can be sequentially generated in stage two processing by removing the stage one defect list generated from the oldest candidate defect lists and including the stage one defect list generated from the newly available candidate defect lists in a sliding window fashion.

To demonstrate the effectiveness and benefit of the present invention, evaluation is performed based on a number of simulated candidate defect lists each including a large number of random nuisances and three systematic defects $P_1$, $P_2$ and $P_3$ of a semiconductor device. Each candidate defect list has approximately 10,000 random nuisances and one, two and three occurrences of the systematic defects $P_1$, $P_2$ and $P_3$ respectively. The design pattern clip for each candidate defect is extracted from the design database. To make the evaluation more realistically, the systematic defect is shifted with a random center offset of less than 0.3 um to simulate the coordinate inaccuracy resulted from wafer inspection.

Figure 5:
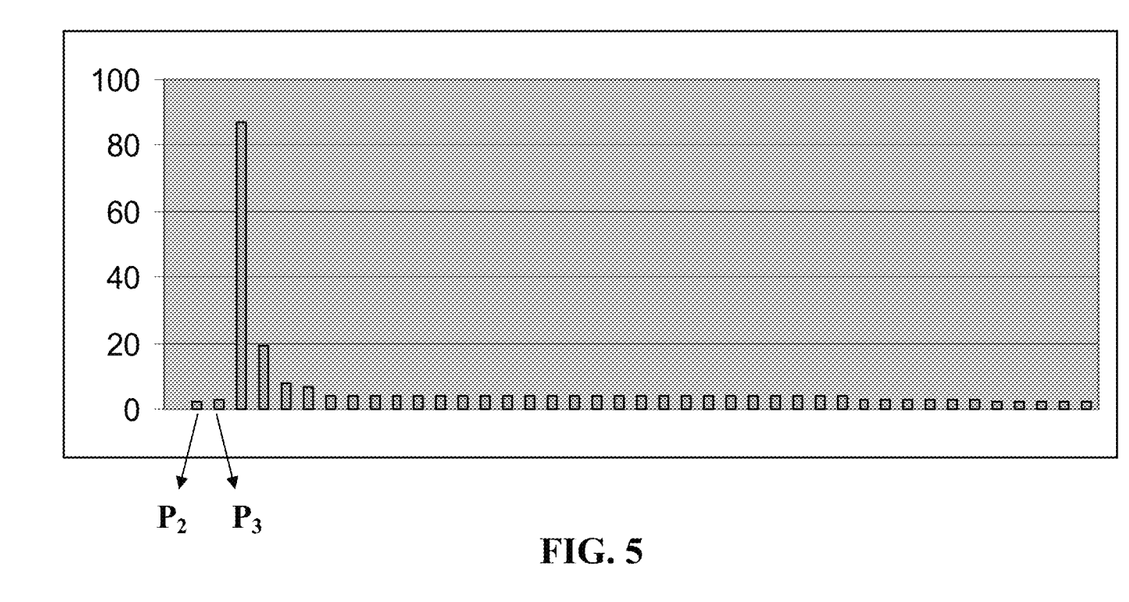
FIG. 5 shows a histogram chart of grouped defects after the candidate defects in an exemplary candidate list are grouped and filtered by stage one processing.

In the grouping and filtering of stage one processing, candidate defects having identical design patterns are grouped together in one defect group with 0.3 um of center shift tolerance. Candidate defects that appear only once are filtered out and not grouped. FIG. 5 shows a histogram chart of grouped defects after the candidate defects in an exemplary candidate list are grouped and filtered by stage one grouping and filtering.

As can be seen in FIG. 5, although there are only three systematic defects in the exemplary candidate list, there are 41 defect groups formed by the large number of nuisances after stage one processing because the nuisances also have similar design patterns among them. In FIG. 5, $P_2$ and $P_3$ represent two systematic defects that are programmed into the exemplary candidate defect list. The center shift tolerance also contributes to the formation of more defect groups because the nearby location of one nuisance may have a design pattern similar to another nuisance. It should also be noted that the systematic defect $P_1$ that occurs only once in a wafer can not be grouped and is filtered out.

Figure 6:
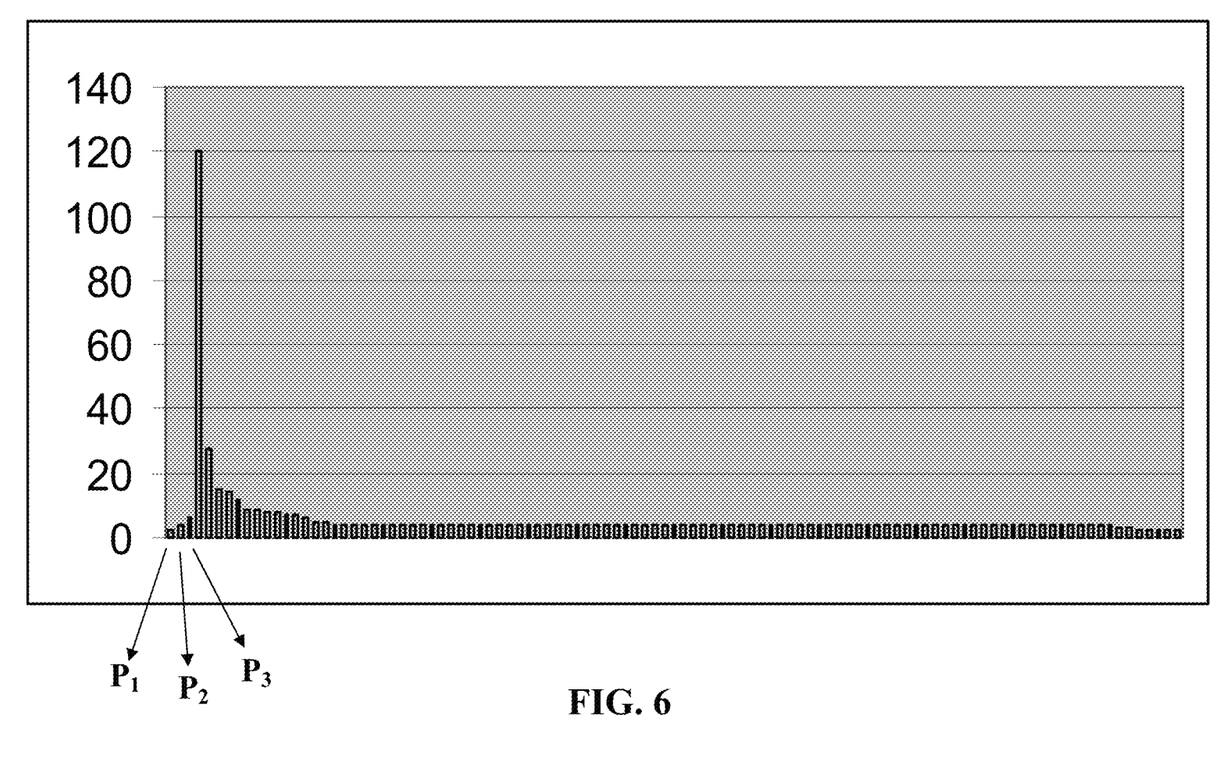
FIG. 6 shows a histogram chart of grouped defects by using two exemplary candidate lists together as the input for stage one grouping and filtering.

FIG. 6 shows a histogram chart of grouped defects by using the exemplary candidate list used in FIG. 5 and one more exemplary candidate list together as inputs for stage one grouping and filtering. As can be seen in FIG. 6, the number of groups increases to 105 because many more random nuisances and the systematic defect $P_1$ that occur only once in a wafer can be grouped now with candidate defects from two simulated candidate defect lists.

Figure 7:
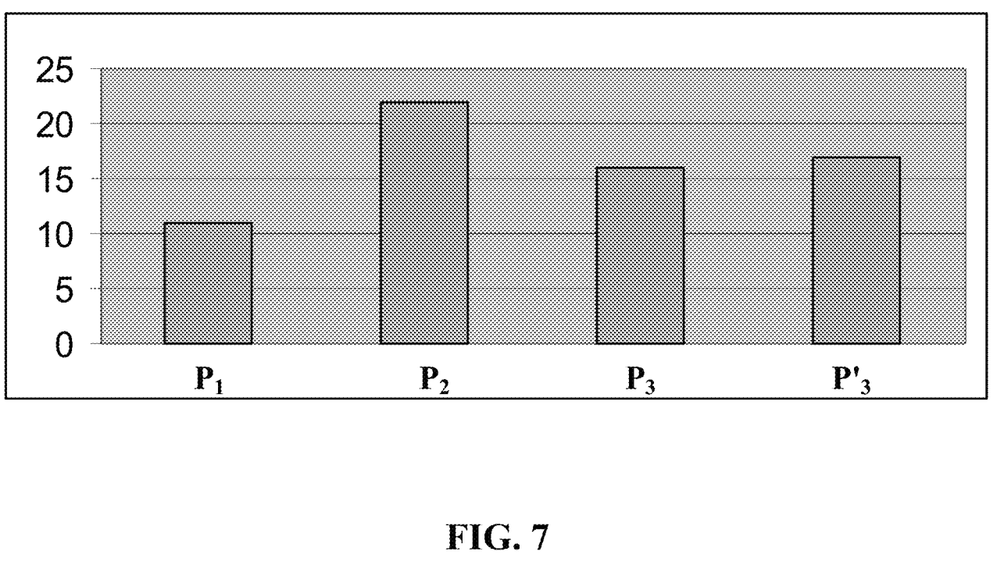
FIG. 7 shows the histogram chart of grouped defects of the final systematic defect list by two stage grouping and filtering using a total of 10 exemplary candidate defect lists.

To proceed with stage two grouping and filtering, another eight simulated candidate defect lists were generated and used in the evaluation. Every two simulated candidate defect lists were used as inputs together to generate a total of five stage one defect lists. The five stage one defect lists are then processed with stage two grouping and filtering to generate the final systematic defect list. FIG. 7 shows the histogram chart of grouped defects of the final systematic defect list.

In stage two filtering, the threshold of filtering out defect groups is increased to 5 because there are 5 stage one defect lists as inputs in the stage two grouping. As can be seen from FIG. 7, the number of defect groups reduces significantly because the chance that the same random nuisance occurs 5 times in the candidate defect lists is quite small. The total number of defect groups is only 4. It is also noted that the systematic defect $P_3$ are divided into two groups. After analyzing the two divided defect groups, it was discovered that because the systematic defects were randomly shifted by +/−0.3 um, the use of 0.3 um as the center shift tolerance for matching the design patterns for systematic defects occurring in different candidate defect lists is not adequate.

Figure 8:
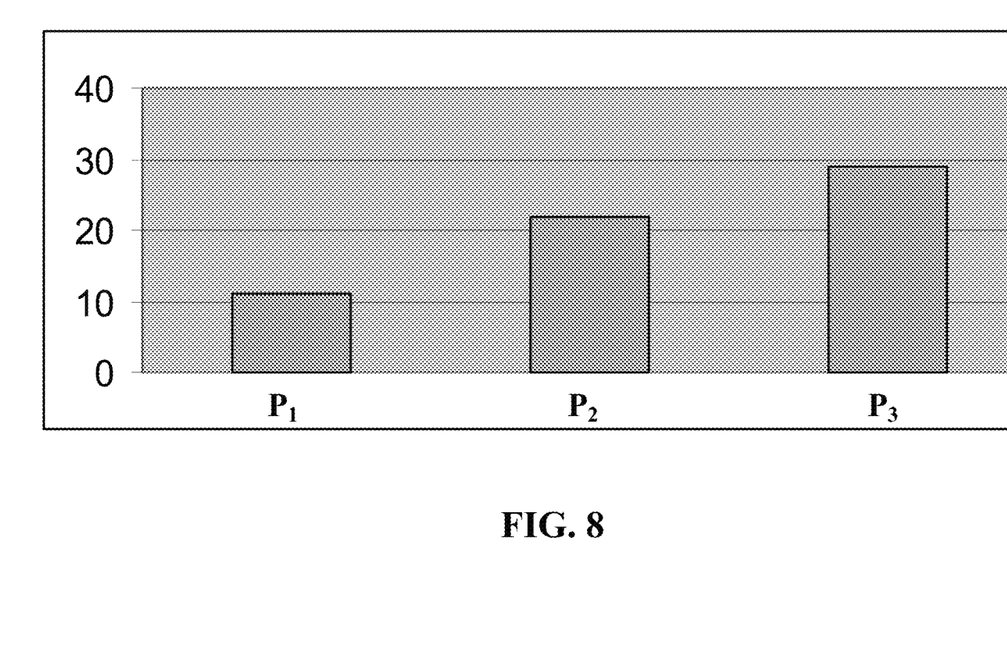
FIG. 8 shows the histogram chart of grouped defects of the final systematic defect list by two stage grouping and filtering using the same exemplary candidate defect lists used in FIG. 7 with an increased center shift tolerance range.

FIG. 8 shows the histogram chart of grouped defects of the final systematic defect list by increasing the center shift tolerance range to 0.5 um. The total number of defects is now 3 and they represent the 3 systematic defects $P_1$, $P_2$ and $P_3$ that are programmed into the candidate defect lists. The systematic defects $P_3$ are no longer divided into two groups. All the random nuisances are filtered out because none of them appears more than 5 times in the candidate defect lists.

From the simulation results illustrated in FIGS. 5-8, it can be understood that the methodology disclosed in the present invention is very useful in identifying systematic defects for improving the yield of manufacturing semiconductor devices. Systematic defects that only occur a handful times on a wafer can be effectively separated and identified from hundreds or millions of random nuisances by using data from multiple wafers and incorporating design data of the semiconductor device.

As shown in FIG. 8, the final systematic defect list comprises a few defect groups each representing one type of a systematic defect. The criticality or priority of the systematic defects can be ranked according to the number of defects in each defect group in the final systematic defect list because a systematic defect having higher frequency occurrences inevitable will cause more yield loss in manufacturing the semiconductor device.

As mentioned earlier, the identified systematic defects can be used to define micro care areas for future wafer inspection. The information of systematic defects can also be used for the device designer or manufacturer to fine tune or change the design rule in the chip design according to the design patterns of the systematic defects to eliminate the root causes of the systematic defects. Furthermore, process engineers in the manufacturing fab can tune the process window or equipment parameters to optimize the manufacturing of the semiconductor device based on the locations or design patterns of the identified systematic defects.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method of identifying systematic defects in wafer inspection using hierarchical grouping and filtering, comprising the steps of:

collecting a plurality of candidate defect lists obtained from inspecting a plurality of wafers of a same semiconductor device, each of said candidate defect lists consisting of a plurality of candidate defects obtained from inspecting one of said plurality of wafers, each of said candidate defects being represented by a plurality of defect attributes including a defect location;

forming a plurality of data sets by dividing said plurality of candidate defect lists into a plurality of groups with each data set consisting of all the candidate defects of one corresponding group;

performing first stage grouping and filtering for said plurality of data sets to generate a plurality of first stage defect lists with each data set being processed independently to generate a corresponding first stage defect list consisting of a portion of the candidate defects in the corresponding data set by grouping candidate defects of similar or identical features into a same defect group and filtering out candidate defects of nuisance type based on a first pre-set criteria;

performing second stage grouping and filtering for all the candidate defects in said plurality of first stage defect lists collectively together to generate a final defect list for said systematic defects by grouping candidate defects having similar or identical features into a same systematic defect group and filtering out candidate defects of non-systematic type based on a second pre-set criteria;

wherein the defect attributes of each candidate defect are used in said first stage grouping and filtering and said second stage grouping and filtering;

forming a group of previous first stage defect lists from all the first stage defect lists used in generating a previous final defect list by excluding one of the first stage defect lists;

collecting a new data set consisting of all the candidate defects of at least one new candidate defect list obtained from inspecting at least one new wafer of the same semiconductor device;

performing first stage grouping and filtering for said new data set to generate a new first stage defect list consisting of a portion of the candidate defects in the new data set; and performing second stage grouping and filtering for all the candidate defects in said new first stage defect list and the group of previous first stage defect lists collectively together to generate a new final defect list for said systematic defects.

2. The method as claimed in claim 1, wherein each of said plurality of data sets consists of the candidate defects of only one candidate defect list.

3. The method as claimed in claim 1, wherein each of said plurality of data sets consists of the candidate defects of at least two candidate defect lists.

4. The method as claimed in claim 1, wherein said second stage grouping and filtering uses a recipe different from the recipe used in said first stage grouping and filtering.

5. The method as claimed in claim 1, wherein said final defect list comprises a plurality of defect groups and each defect group is considered as a systematic defect if said second pre-set criteria is satisfied.

6. The method as claimed in claim 5, wherein said second pre-set criteria is the number of candidate defects in the defect group exceeding a pre-set threshold.

7. The method as claimed in claim 5, wherein the plurality of defect groups in said final defect list are ranked based on the number of candidate defects in each defect group for determining criticality of the systematic defects.

8. The method as claimed in claim 5, wherein a critical area is defined for an identified systematic defect according to the defect locations of the candidate defects in the defect group corresponding to the identified systematic defect and the critical area is used as a micro care area in future wafer inspection of the same semiconductor device.

9. The method as claimed in claim 5, wherein a design pattern clip extracted from a design database based on the defect location of each candidate defect is used in said first stage grouping and filtering and said second stage grouping and filtering.

10. The method as claimed in claim 9, wherein in said first stage grouping and filtering and said second stage grouping and filtering, candidate defects having an identical design pattern are grouped in a same defect group.

11. The method as claimed in claim 10, wherein the design pattern of the defect group corresponding to an identified systematic defect is used to search the design database for identifying a plurality of critical areas having the same design pattern, and the plurality of critical areas are used as micro care areas in future wafer inspection of the same semiconductor device.

12. The method as claimed in claim 5, wherein a high-resolution electron-beam image pattern is acquired based on the defect location of each candidate defect and used in said first stage grouping and filtering and said second stage grouping and filtering.

13. The method as claimed in claim 1, wherein the method is used in a wafer production line to sequentially generate final defect lists for monitoring trends of systematic defects by inspecting every group of a predetermined number of wafers to obtain said plurality of candidate defect lists for the hierarchical grouping and filtering, and generating an updated final defect list for each group of wafers.

14. The method as claimed in claim 13, wherein two adjacent groups of the predetermined number of wafers have at least one common wafer.

15. The method as claimed in claim 1, wherein in the step of performing first stage grouping and filtering for said plurality of data sets, each data set is processed independently with said plurality of data sets being processed concurrently.

16. The method as claimed in claim 1, wherein a distributed computing system comprising a plurality of computing devices and a data storage system is used for performing the method, said plurality of computing devices being configured as a plurality of computing nodes for performing the hierarchical grouping and filtering.

17. The method as claimed in claim 16, wherein the step of performing first stage grouping and filtering for said plurality of data sets to generate a plurality of first stage defect lists is accomplished by processing each data set independently in one of said plurality of computing nodes so that said plurality of data sets are processed concurrently.

18. The method as claimed in claim 1, wherein the method is used in a wafer production line to sequentially generate new final defect lists for monitoring trends of systematic defects by sequentially obtaining said at least one new candidate defect list from inspecting at least one new wafer to form said new data set.

* * * * *